(12) United States Patent
Taniguchi et al.

(10) Patent No.: US 9,431,859 B2
(45) Date of Patent: Aug. 30, 2016

(54) ROTATING ELECTRIC MACHINE (71) Applicant: DENSO CORPORATION, Kariya, Aichi-pref. (JP)

(72) Inventors: Makoto Taniguchi, Obu (JP); Hiroki Tomizawa, Chiryu (JP); Tatsuya Inagaki, Nishio (JP); Masahiro Goto, Kosai (JP)

(73) Assignee: DENSO CORPORATION, Kariya (JP)

( * ) Notice: Subject to any disclaimer, the term of this patent is extended or adjusted under 35 U.S.C. 154(b) by 306 days.

(21) Appl. No.: 14/142,218

(22) Filed: Dec. 27, 2013

(65) Prior Publication Data
US 2014/0184009 A1    Jul. 3, 2014

(30) Foreign Application Priority Data

Dec. 28, 2012 (JP) .................................. 2012-286671

(51) Int. Cl.
*H02K 21/12* (2006.01)
*H02K 1/27* (2006.01)

(52) U.S. Cl.
CPC ......... *H02K 1/2746* (2013.01); *H02K 2213/03* (2013.01)

(58) Field of Classification Search
CPC ............. H02K 12/27; H02K 12/2766; H02K 12/2746; H02K 2213/03
USPC ....................................... 310/156.01–156.84
See application file for complete search history.

(56) References Cited

U.S. PATENT DOCUMENTS

| 8,179,011 B2 | 5/2012 | Takemoto et al. | |
|---|---|---|---|
| 2008/0278102 A1* | 11/2008 | Taniguchi | B62D 5/046 318/400.27 |
| 2010/0289370 A1* | 11/2010 | Roth | H02K 1/276 310/156.53 |
| 2012/0326547 A1* | 12/2012 | Suzuki | H02K 1/2746 310/156.15 |
| 2013/0106229 A1* | 5/2013 | Goto | H02K 1/2746 310/156.54 |

FOREIGN PATENT DOCUMENTS

| JP | 2005-185081 | 7/2005 |
|---|---|---|
| JP | 2012-205429 | 10/2012 |

* cited by examiner

*Primary Examiner* — Hanh Nguyen
(74) *Attorney, Agent, or Firm* — Nixon & Vanderhye P.C.

(57) ABSTRACT

A motor is provided having a consequent-pole type rotor that has soft magnetic material poles and magnetic poles positioned around the rotor in an alternating manner. A convex surface on each of the poles is formed as a surface in which a midpoint of the convex surface has a radial distance from the rotation axis that is greater than a radial distance of the circumferential edges of the convex surface from the rotation axis. A radial width of a first magnetism transfer part of a cylindrical yoke and a radial width of a second magnetism transfer part of the magnetic pole fulfill a relationship such that an appropriate balance of the magnetic resistance between the first magnetism transfer part and the second magnetism transfer part is achieved. As a result, cogging torque is reduced without reducing output torque.

15 Claims, 11 Drawing Sheets

ROTATING ELECTRIC MACHINE

CROSS-REFERENCE TO RELATED APPLICATION

This application is based on and claims the benefit of priority of Japanese Patent Application No. 2012-286671 filed on Dec. 28, 2012, the disclosure of which is incorporated herein by reference.

TECHNICAL FIELD

The present disclosure generally relates to a rotor and a rotating electric machine that has a rotor.

BACKGROUND

Generally, rare-earth magnets are commonly used in motors and generators because they allow the motors and generators to be more compact in size. However, the supply of rare-earth magnets is not sustainable due to limited availability and skewed supply locations. Therefore, it is desirable to reduce the amount of rare-earth magnets in motors and generators.

For example, a patent document 1 (i.e., Japanese Patent Laid-Open No. 2010-252530) discloses a consequent-pole type rotor in which a permanent magnet is positioned within every other pole. That is, when the first and second salient poles are alternatingly arranged in a circumferential direction, a permanent magnet is only positioned in the first salient pole. A soft magnetic material pole is positioned in the second salient pole. In such a consequent-pole type rotor, the soft magnetic material pole is "consequently" magnetized to have the same pole as an inner face side pole of the permanent magnet that is buried in the magnetic pole, which results in an alternating arrangement of N poles and S poles on the rotor's surface. As a result, the number of permanent magnets used in the rotor is reduced in half, thereby simultaneously reducing cost and rare-earth magnet procurement risk.

However, a consequent-pole type rotor may suffer from cogging torque due to interaction between the permanent magnets. As a result, cogging torque may produce torque output fluctuations at low speeds and reduce motor efficiency.

With regards to cogging torque, a distribution of magnetic flux in a gap between the rotor and the stator may change according to a balance between a first magnetic resistance at an inside portion in the radial direction and a second magnetic resistance at an outside portion in the radial direction relative to the permanent magnet in the rotor. More practically, when reducing the second magnetic resistance by shifting the position of the permanent magnet toward an outside in the radial direction, the magnetic flux density between the magnetic pole of the rotor and the teeth on the stator increases. Alternatively, when increasing the second magnetic resistance by shifting the position of the permanent magnet toward an inside in the radial direction, the magnetic flux density between the magnetic pole of the rotor and the teeth on the stator decreases. Especially, in a buried magnet type rotor, which generally has a smaller gap between the rotor and the stator, the balance between the first magnetic resistance and the second magnetic resistance increasingly affects the magnetic flux density.

Therefore, a correlation exists between (i) a dimension of a certain part that is related to the position of the permanent magnet in the radial direction and (ii) the output torque and the cogging torque, and completed the present disclosure.

SUMMARY

It is an object of the present disclosure to provide a rotor of a rotating electric machine that reduces a cogging torque without reducing output torque.

In an aspect of the present disclosure, the rotor of the rotating electric machine of the present disclosure includes a cylindrical boss having a rotation axis, a plurality of ribs extending radially outward from the cylindrical boss, and a cylindrical yoke connecting outer radial ends of the plurality of ribs. A plurality of soft magnetic material poles extends radially outward from the cylindrical yoke. A plurality of magnetic poles extends radially outward from the cylindrical yoke at positions between the plurality of the soft magnetic material poles, and each magnetic pole having a magnet hole. A plurality of permanent magnets are positioned within the cylindrical yoke, the plurality of permanent magnets having a thickness direction aligned with a radial direction of the cylindrical yoke, and each permanent magnet positioned within each magnet hole.

The magnetic pole has (i) a magnetism transfer part positioned outside of the magnet hole such that the magnetism transfer part extends radially outward with respect to the rotation axis and relative to the magnet hole, and (ii) a connecting part connecting circumferential ends of the magnetism transfer part.

More specifically, in the present disclosure, a width of the cylindrical yoke in the radial direction is defined as 'a', a width of the magnetism transfer part in the radial direction is defined as 'b', and $2.0 \leq (a/b) \leq 2.7$.

According to the present disclosure, when the above relationship is established, a balance between (i) a magnetic resistance of the yoke and (ii) a magnetic resistance of the magnetism transfer part of the magnetic pole may be established, thereby reducing cogging torque without reducing output torque. Such effects may be greater when a convex outer surface of both the soft magnetic material pole and the magnetic pole in the radial direction have a midpoint positioned farther from the rotation shaft of the rotor than the circumferential edges of the soft magnetic material pole and the magnetic pole. That is, in other words, when the outer surface of the both poles have a convex shape that extends outwardly away from the rotation shaft of the rotor, the above-described effects are achieved.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Plural embodiments of the present disclosure are described with reference to the drawings in the following. Like parts in the embodiments have like numbers, and description of the like parts is omitted for the brevity of description.

First Embodiment

Figure 1:
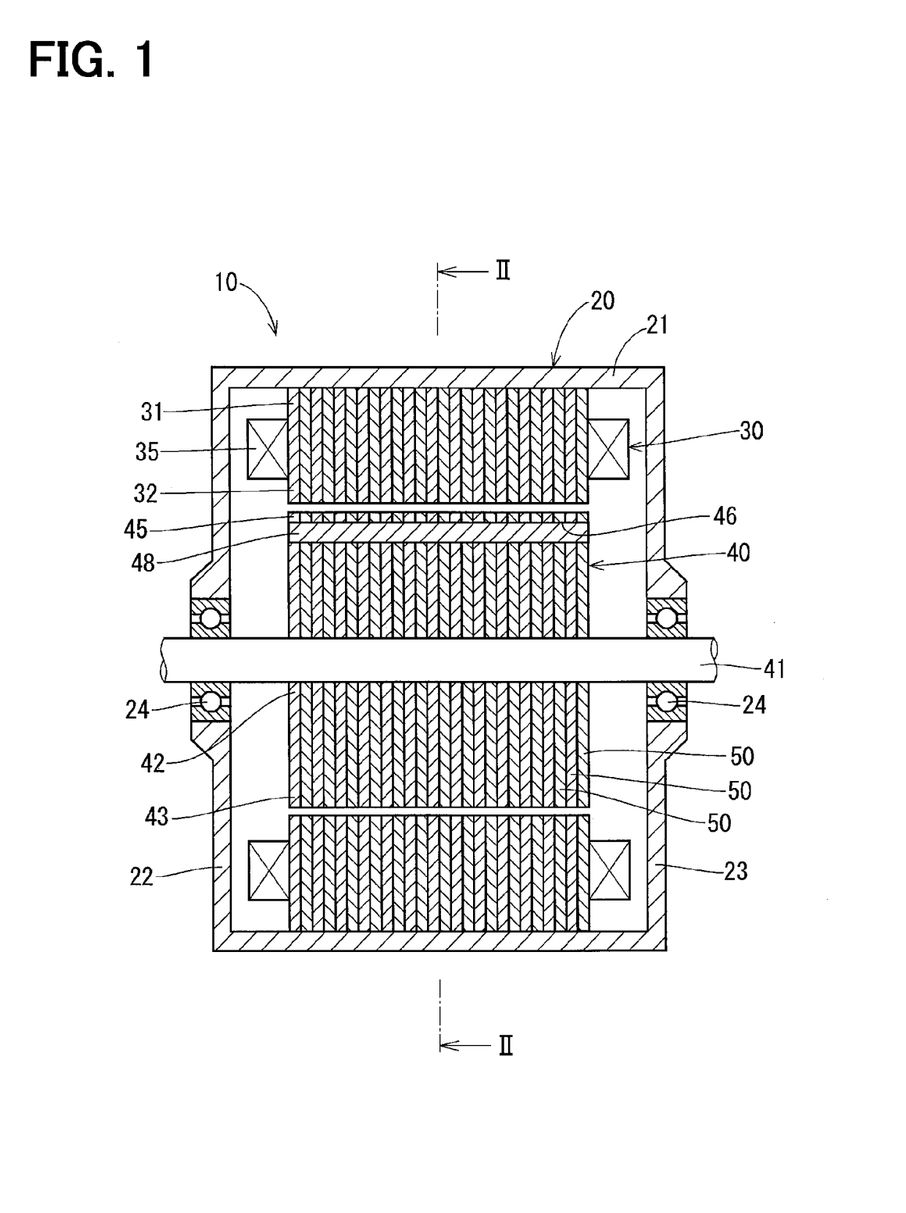
FIG. 1 is a vertical cross sectional view of a motor in which a rotor in a first embodiment of the present disclosure is used.

The present disclosure is described as a "rotating electric machine" which has a rotor described in detail in the following, which is shown in FIG. 1 and in other drawings. In the present embodiment, a motor configuration of a motor 10 is described based in FIG. 1 to FIG. 3. The motor 10 is a three-phase brushless motor having a housing 20, a stator 30, and a rotor 40.

Figure 2:
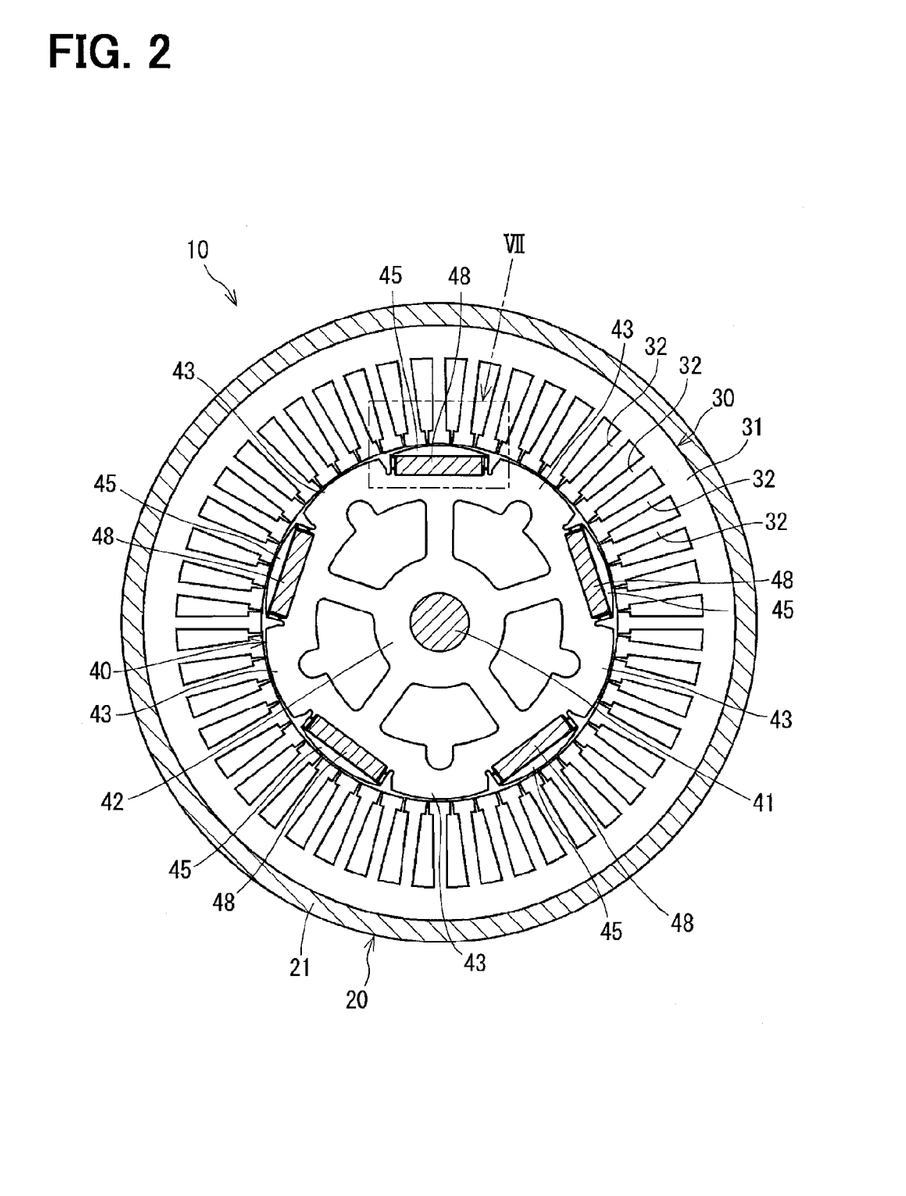
FIG. 2 is a cross sectional view of the motor in FIG. 1 along a line II-II.

As shown in FIGS. 1 and 2, the housing 20 includes a cylindrical portion 21 and a first side portion 22 for enclosing one side of the cylindrical portion 21 and a second side portion 23 for enclosing the other side of the cylindrical portion 21. A bearing 24 is installed at a center of the first side portion 22 and at a center of the second side portion 23.

The stator 30 is an armature of the motor 10, and includes a back yoke 31, plural teeth 32 and plural windings 35. The back yoke 31 is formed in the shape of a cylinder, and, is press-fitted into an inner wall of the cylindrical portion 21 of the housing 20, for example. Each of the plural teeth 32 extends radially inwardly from the back yoke 31. The back yoke 31 serves as a connecting part to connect together each of the plural teeth 32 at their outer ends in the radial direction. The winding 35 is disposed in a slot 36 that is defined as a space between two teeth 32. The winding 35 includes a U-phase winding, a V-phase winding and a W-phase winding. In FIG. 2, the winding 35 is not shown in the drawing for the clarity of other parts.

The rotor 40 is a permanent field magnet of the motor 10, and includes a rotation shaft 41, a rotor core 42, plural soft magnetic material poles 43, plural magnetic poles 45 and plural permanent magnets 48. The rotation shaft 41 is rotatably supported by the bearing 24. The rotor core 42 is formed in the shape of a cylinder, and, is co-axially positioned with the rotation shaft 41, for example. Each of the soft magnetic material poles 43 is a salient pole protruding from the rotor core 42 in the radial direction toward an outside of the motor 10. The soft magnetic material poles 43 are separated by a gap in its arrangement along the circumferential direction. Each of the magnetic poles 45 is also a salient pole protruding from the rotor core 42 in the radial direction toward an outside of the motor 10. One magnetic pole 45 is provided at a position between the two soft magnetic material poles 43.

The permanent magnet 48 is made from a rare-earth magnet, and is buried in the magnetic pole 45. The magnetic pole 45 is, more practically, formed to have a magnet hole 46 that axially penetrates the pole 45, and the permanent magnet 48 having a board shape is inserted in the magnet hole 46, so that a thickness direction of the permanent magnet 48 is aligned with a radial direction of the motor 10. Each of the permanent magnets 48 is arranged in the hole 46 to have the same pole (i.e., either an N pole or an S pole) facing outward of the rotor 40. An outer wall of the magnetic pole 45 in the radial direction, which is on an outside in the radial direction, is magnetized to have the same pole as the pole on the outside of the permanent magnet 48 in the radial direction. On the other hand, an outer wall of the soft magnetic material pole 43, which is on an outside in the radial direction, is magnetized to have an opposite pole as the pole on the outside of the permanent magnet 48 in the radial direction.

The rotor 40 is a consequent-pole type rotor, which has the soft magnetic material poles 43 and the magnetic poles 45 that are alternatingly arranged as plural type poles in the circumferential direction.

The features of the motor 10 are described in the following based on FIG. 1 to FIG. 8.

An outer diameter of the rotor 40 in the motor 10 is equal to or smaller than 60 [mm], and is used as a power source of a vehicular electric power steering.

Figure 7:
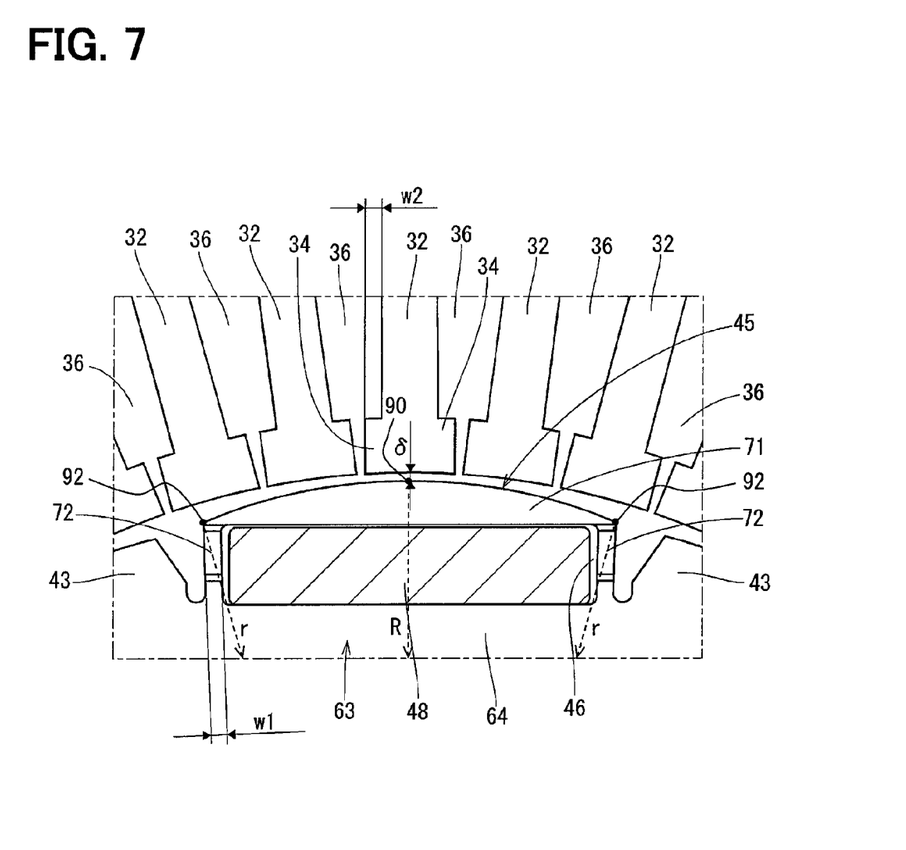
FIG. 7 is an enlarged view at a portion indicated by arrow VII part in FIG. 2.

As shown in FIG. 7, the teeth 32 of the stator 30 are configured to have a brim part 34 that is positioned at an inner end in the radial direction to extend in the circumferential direction. The teeth 32 of the stator 30 are configured to have 60 pieces at equal intervals in the circumferential direction. The number of the slots 36 is thus 60. The winding method of the winding 35 is a full-pitch winding.

The rotor core 42 and the soft magnetic material pole 43 and the magnetic pole 45 are all formed as layered board members 50 that are layered along the axial direction. The number of the soft magnetic material poles 43 is the same as the number of magnetic poles 45. In the present embodiment, the rotor 40 has five soft magnetic material poles 43 and five magnetic poles 45. Therefore, the total number of poles on the rotor 40 is ten.

Figure 3:
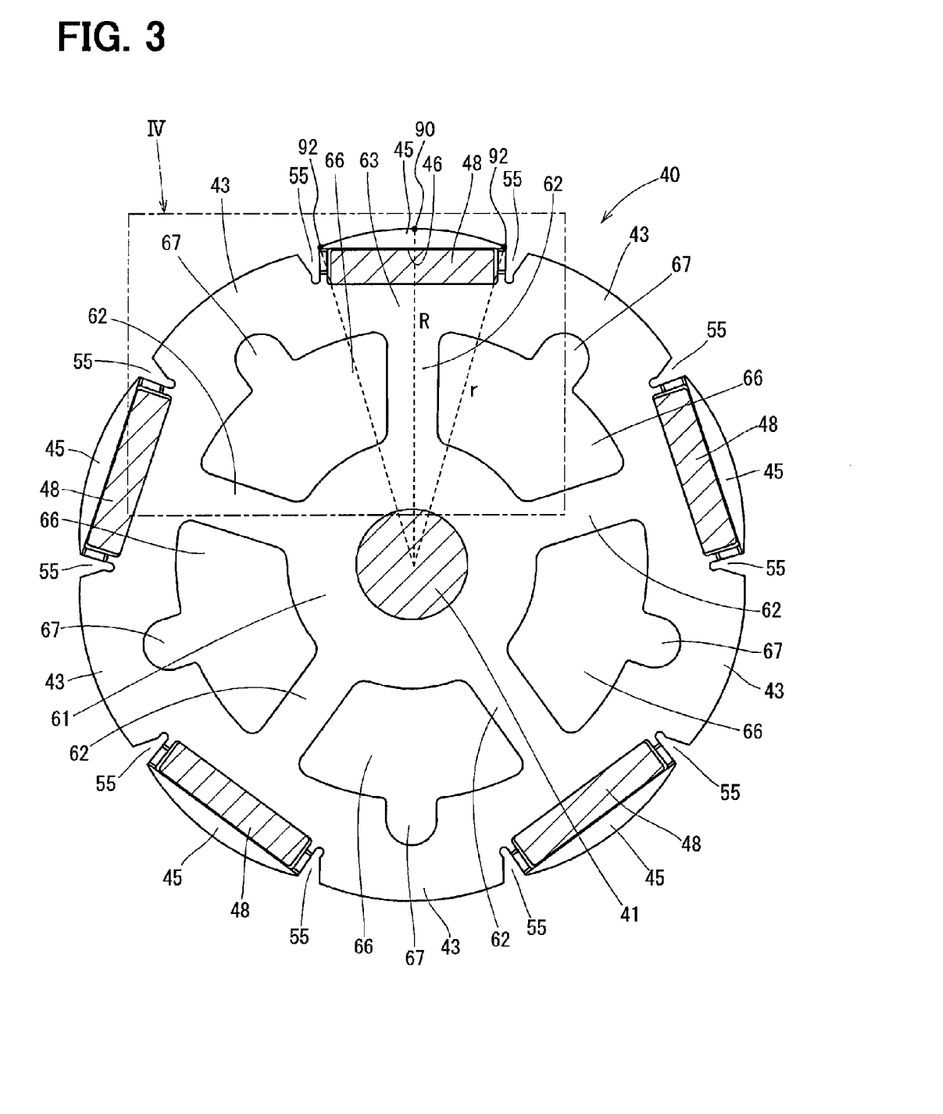
FIG. 3 is a cross sectional view of the rotor in FIG. 2.
Figure 4:
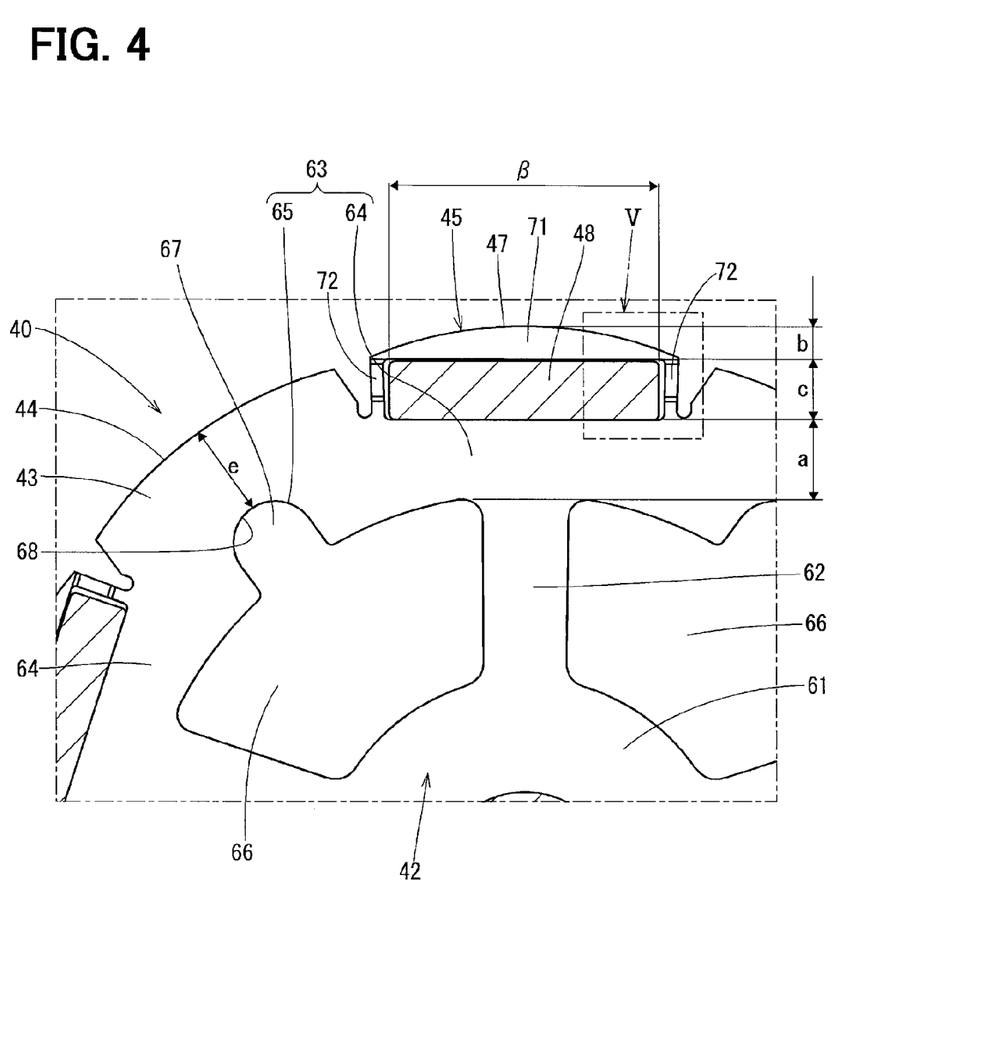
FIG. 4 is an enlarged view at a portion indicated by arrow IV part in FIG. 3.

As shown in FIGS. 3 and 4, the rotor core 42 has a cylindrical boss 61, plural ribs 62 and a yoke 63 formed thereon. The cylindrical boss 61 is formed in the shape of a cylinder, and is, for example, press-fitted to the rotation shaft 41. Each rib 62 extends radially from the cylindrical boss 61, and connects the yoke 63 and the cylindrical boss 61. The yoke 63 is formed in the shape of a cylinder, and is positioned co-axially with the cylindrical boss 61. The yoke 63 connects outer ends of the ribs 62. Between each of the ribs 62, a through hole 66 that axially penetrates the rotor 40 is defined.

The yoke 63 has, at an inner position relative to the magnetic pole 45 in the radial direction, a first magnetism transfer part 64 and has, at an inner position relative to a circumferential center part of the soft magnetic material pole 43 in the radial direction, a magnetism resistant part 65 as shown in FIG. 4. The first magnetism transfer part 64 extends in the circumferential direction, in a manner that connects a pair of the soft magnetic material poles 43 on both sides of the magnetic pole 45 in the circumferential direction. The magnetism resistant part 65 includes a concave cavity 67 that extends outwardly from the through hole 66. The magnetism resistant part 65 has a higher magnetic resistance than the first magnetism transfer part 64, and, more specifically, it suppresses a flow of the magnetic flux from one first magnetism transfer part 64 to another first magnetism transfer part 64.

The magnetic pole 45 is formed as (i) a second magnetism transfer part 71 that is adjacent to the magnet hole 46 on an outside in the radial direction and (ii) a connecting part 72 that connects the yoke 63 and of the ends in the circumferential direction ends of the second magnetism transfer part 71. The second magnetism transfer part 71 is thus equivalent to a "magnetism transfer part" in the claims.

According to the present disclosure, a correlation between the cogging torque and the output torque is yielded/observed for an evaluation value E, which is an index that is calculated as a ratio of 'a' and 'b' according to the following equation (1), where 'a' represents a radial direction width of the first magnetism transfer part 64 of the yoke 63 and 'b' represents a radial direction width of the second magnetism transfer part 71 of the magnetic pole 45, as shown in FIG. 4.

$$E=a/b \quad (1)$$

Figure 8:
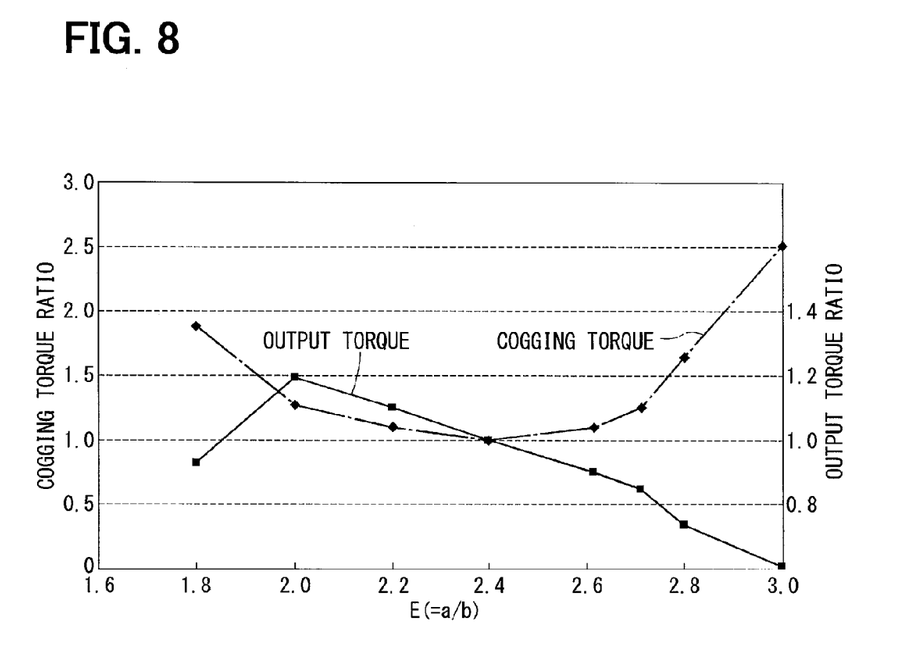
FIG. 8 is a diagram of a change of a cogging torque according to a change of an evaluation value.

FIG. 8 illustrates a change of the cogging torque and the output torque for various evaluation values E. As clearly understood from FIG. 8, the output torque is maximized with the cogging torque reduced to the minimum for the range of evaluation value E in an equation (2).

$$2.0 \leq (a/b) \leq 2.7 \quad (2)$$

The other characteristic dimensions of the rotor 40 are as follows.

One of the other characteristic dimensions is shown in an equation (3), when a radial direction width of the magnet hole 46 is designated as 'c'.

$$b \leq c \leq a \quad (3)$$

Another one of the other characteristic dimensions is shown in an equation (4), when a shortest distance in a radial direction between (i) a convex surface 44 of the soft magnetic material pole 43 and (ii) a concave surface 68 of a concave cavity 67 is designated as 'e'.

$$a \leq e \leq (a+b) \quad (4)$$

The convex surface 44 of the soft magnetic material pole 43 and the convex surface 47 on an outside in the radial direction of the magnetic pole 45 are both curved surfaces where the center of the convex surface (i.e., a center of the convex surface along the circumferential direction) is positioned on an outside in the radial direction than edges of the convex surface. More practically, the convex surface 44 has its center of curvature positioned closer to itself (i.e., the surface 44) than to the rotation shaft, and the convex surface 47 has its center of curvature positioned closer to itself (i.e., the surface 47) than to the rotation shaft.

The gap between the convex surface 44 and the teeth 32 as well as the gap between the convex surface 47 and the teeth 32 are smallest at its center in the circumferential direction, and those gaps increase toward their edges in the circumferential direction. Further, yet another one of the other characteristic dimensions is shown in an equation (5) when a shortest distance of the gap between (i) the convex surface 44 or the convex surface 47 and the teeth 32 is designated as δ, as shown in FIG. 7.

$$2\delta \leq b \leq 4\delta \quad (5)$$

Figure 6:
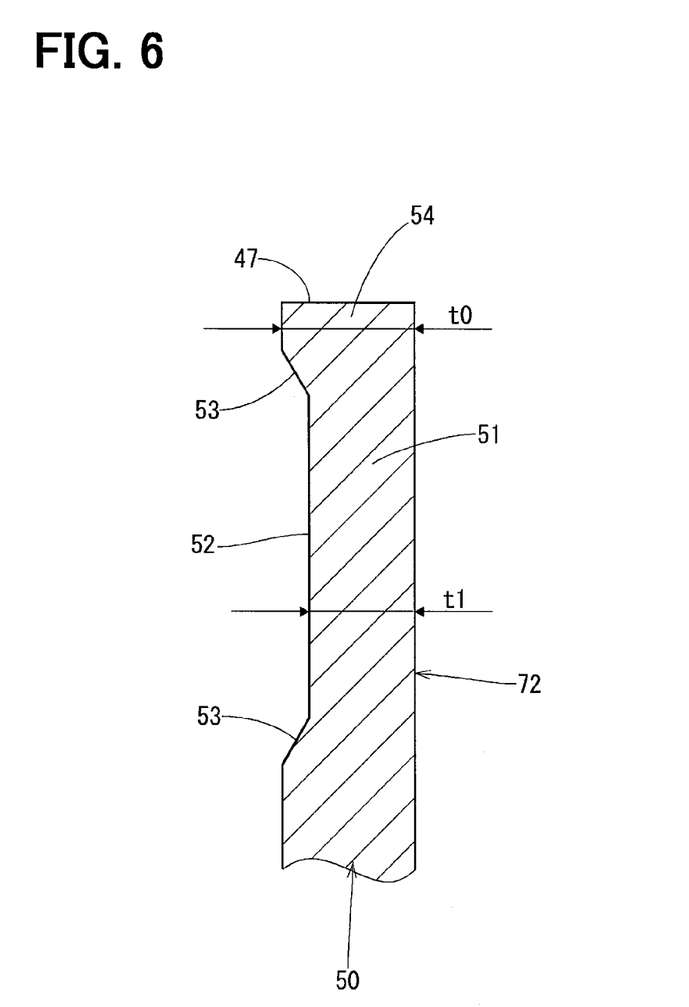
FIG. 6 is a cross sectional view of a part in FIG. 5 along a line VI-VI.

The connecting part 72 of the magnetic pole 45 is configured to have a higher magnetic resistance than the second magnetism transfer part 71. More practically, a first portion 51 of the board member 50 serving as the connecting part 72 of the magnetic pole 45 includes a narrowed region 52 and an angled region 53 as shown in FIG. 6. The thickness of the narrowed region 52 is thinner by 10% or more than a second portion 54 of the board member 50 serving as the second magnetism transfer part 71 of the magnetic pole 45. The board thickness is continuously changed by the angled region 53, from the second portion 54 serving as the second magnetism transfer part 71 toward the narrowed region 52.

When a width of the connecting part 72 in the circumferential direction is designated as w1, as shown in FIG. 7, and a board thickness of the second portion 54 of the board member 50 serving as the second magnetism transfer part 71 of the magnetic pole 45 is designated as t0, as shown in FIG. 6, still yet another one of the other characteristic dimensions is shown in an equation (6).

$$1.0 \leq (w1/t0) \leq 2.0 \quad (6)$$

Further, when a protrusion length of the brim part 34 of the teeth 32 is designated as w2, as shown in FIG. 7, still yet another one of the other characteristic dimensions is shown in an equation (7).

$$w1 \leq w2 \quad (7)$$

Figure 5:
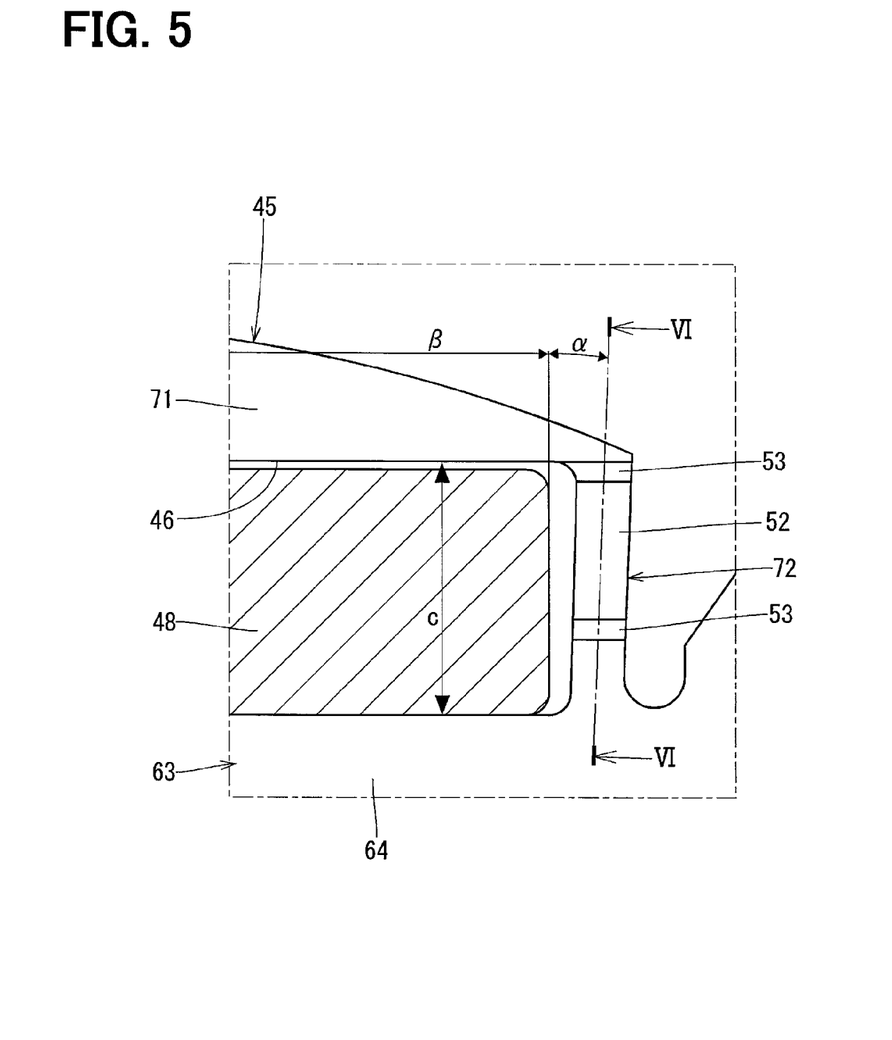
FIG. 5 is an enlarged view at a portion indicated by arrow V part in FIG. 4.

Further, when an angle between an extending direction of the connecting part 72 of the magnetic pole 45 (i.e., a connection direction of the part 72) and a thickness direction of the permanent magnet 48 is designated as α, as shown in FIG. 5, still yet another one of the other characteristic dimensions is shown in an equation (8).

$$\alpha \leq 25 \text{ [deg]} \quad (8)$$

The first embodiment of the motor 10 is, as described above, a motor having a consequent-pole type rotor 40, in which the dimensions of the rotor 40 are set to fulfill the relationship in the equation (2), when the 'a' represents a radial direction width of the first magnetism transfer part 64 of the yoke 63 and the 'b' represents a radial direction width of the second magnetism transfer part 71 of the magnetic pole 45. By designing such dimensions, an appropriate balance of the magnetic resistance between the first magnetism transfer part 64 and the second magnetism transfer part 71 is achieved, for the reduction of the cogging torque without reducing the output torque.

Further, in the present embodiment, the radial direction width c of the magnet hole 46 is set to fulfill a relationship of the equation (3). In such manner, a correlation is established between (i) the magnetic resistance of the first magnetism transfer part 64 and the second magnetism transfer part 71 and (ii) the thickness of the permanent magnet 48, i.e., the magnitude of the magnetomotive force of the permanent magnet 48. Therefore, even when specifications of the permanent magnet 48 are changed, a magnetic circuit having an appropriate dimension can be easily re-designed.

Further, in the present embodiment, the yoke 63 has the magnetism resistant part 65 that is positioned on an inside of the center of the soft magnetic material pole 43 in the radial direction. The magnetic resistance of the magnetism resistant part 65 is higher than the magnetic resistance of the first magnetism transfer part 64. More specifically, the magnetism resistant part 65 restricts a magnetic flux that flows from one first magnetism transfer part 64 to the other first magnetism transfer part 64. Therefore, according to such configuration, the flow of the magnetic flux in the soft magnetic material pole 43 is made smoother, and thereby prevents a useless stoppage of the magnetic flux in the pole 43. As a result, an amount of the permanent magnet 48 to be used for achieving the same effect is reduced.

Further, in the present embodiment, the magnetism resistant part 65 includes the concave cavity 67 that extends from the through hole 66 toward an outside in the radial direction. Therefore, the magnetism resistant part 65 can be easily formed by a press molding or the like.

Further, in the present embodiment, the shortest distance 'e' between the convex surface 44 of the soft magnetic material pole 43 and the concave surface 68 of the concave cavity 67 is set to fulfill the equation (4). Such quantification of the shortest distance 'e' makes it easier to design an appropriate magnetic circuit.

Further, in the present embodiment, both of the convex surface 44 of the soft magnetic material pole 43 and the convex surface 47 on the outside of the magnetic pole 45 in the radial direction are the curved surfaces where the centers 90 (i.e., midpoints) of the respective convex surfaces in the circumferential direction extend further in radial direction than the outer edges 92 of the respective convex surfaces. Further, the gap between the convex surface 44 and the teeth 32 as well as the gap between the convex surface 47 and the teeth 32 are smallest at the center 90 (i.e., midpoints) of the respective convex surfaces in the circumferential direction, and those gaps increase toward the edges 92 of the respective convex surfaces in the circumferential direction. When the shortest distance of the gap between (i) the convex surface 44 or the convex surface 47 and (ii) the teeth 32 is designated as δ, the relationship shown in the equation (5) is fulfilled. By designing the dimensions in such manner, the above-described effects are made more apparent, for more effectively reducing the cogging torque.

Further, in the present embodiment, the first portion 51 of the board member 50 serving as the connecting part 72 of the magnetic pole 45 forms the narrowed region 52. The thickness of the narrowed region 52 is thinner by 10% or more than the second portion 54 of the board member 50 serving as the second magnetism transfer part 71 of the magnetic pole 45. In such manner, the connecting part 72 of the magnetic pole 45 is configured to have a higher magnetic resistance than the second magnetism transfer part 71. Therefore, the amount of the magnetic flux that passes through the connecting part 72 of the magnetic pole 45 and short-circuits (i.e., does not pass through) the permanent magnet 48 is effectively reduced. As a result, the amount of the permanent magnet 48 used in the rotor 40 is reduced.

Further, the first portion 51 of the board member 50 serving as the connecting part 72 of the magnetic pole 45 may be easily formed by press-molding, for example.

Further, in the present embodiment, the first portion 51 of the board member 50 serving as the connecting part 72 of the magnetic pole 45 includes angled region 53, by which the board thickness is continuously changed from the second portion 54 serving as the second magnetism transfer part 71 toward the narrowed region 52. That is, the board thickness varies along the length of the portion of the board member 50 serving as the connecting part 72. Therefore, concentration of the stress on the board member 50 is effectively reduced.

Further, in the present embodiment, the windings 35 are wound in the full-pitch winding method. In other words, the pitch of the windings 35 in the rotating direction is a full-pitch. In such manner, vibration of the rotor 40 in the radial direction due to the torque ripple or due to the mixed use of the magnetic poles 45 and the soft magnetic material poles 43 is absorbed by a symmetric distribution of the reactive magnetic field of the stator 30, for meeting very strict requirements of the motor for use in an electric power steering.

Further, when the windings 35 are full-pitch windings, there should always be plural teeth 32 between two magnetic poles on the rotor 40. In other words, after reaching the stator 30 from the rotor 40 through a gap, the magnetic flux returns to the rotor 40 by not passing through (i.e., jumping) many gaps between the teeth 32 but by passing through the back yoke 31, because a "through-back-yoke" route has a lower magnetic resistance than a "jumping-gap" route. That is, more practically, such structure is beneficial for the reduction of the short-circuit magnetic flux that short-circuits the permanent magnet 48. More specifically, such structure works especially effectively in the present embodiment, since two or more teeth 32 are provided for each phase and for each pole in the motor structure in the present embodiment.

Further, in the present embodiment, the width of the connecting part 72 in the circumferential direction designated as w1, the thickness of the board member 50 designated as t0, and the protrusion length of the brim part 34 of the teeth 32 designated as w2 are configured to fulfill the relationships shown in the equations (6) and (7). Further, the angle α between an extending direction of the connecting part 72 of the magnetic pole 45 and a thickness direction of the permanent magnet 48 is configured to fulfill the relationship shown in the equation (8). In such manner, a design policy of the magnetic resistance in the connecting part 72 can be determined solely based on the geometrical dimensions of the connecting part 72, without considering or independent of the characteristics of the material of the connecting part 72. As such, the design efficiency of the connecting part 72 is improved.

Second Embodiment

Figure 9:
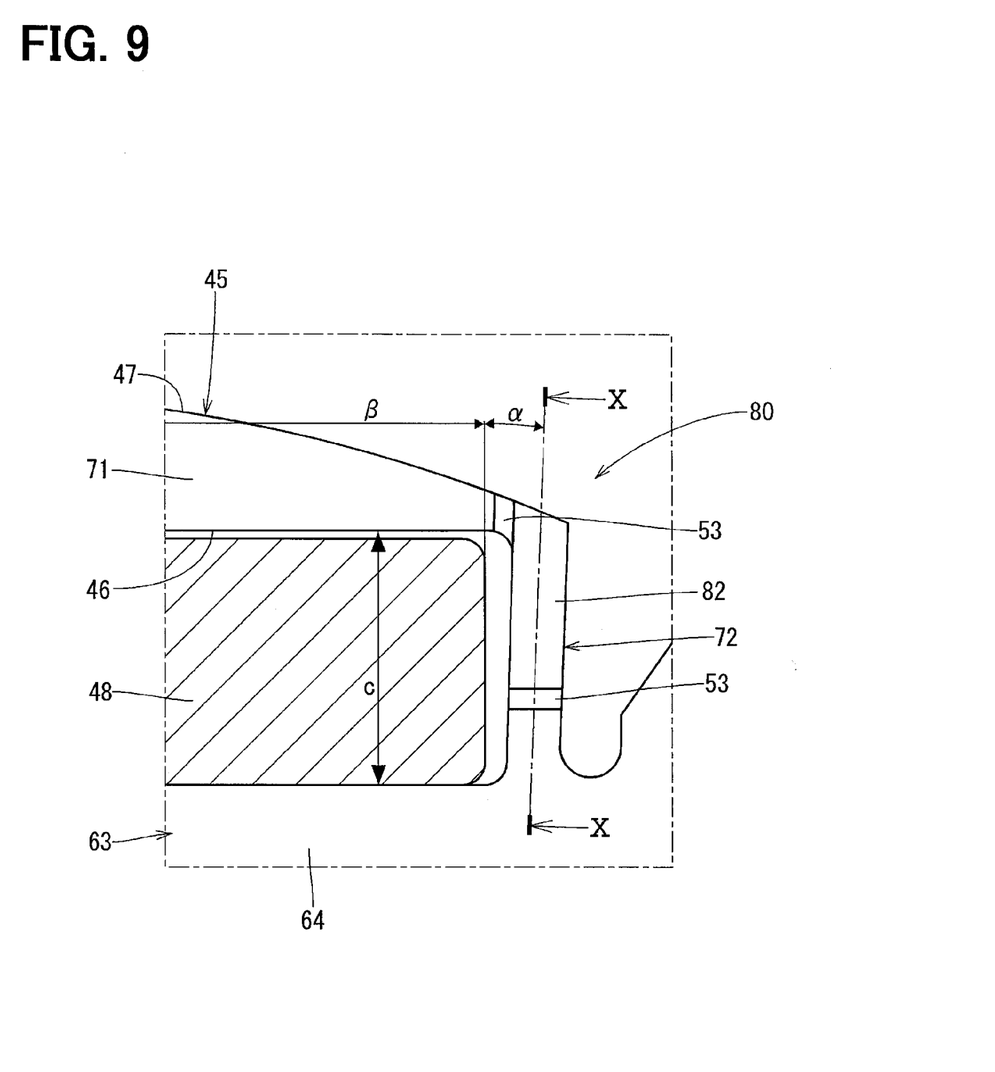
FIG. 9 is a partial enlarged view of a magnetic pole of the rotor in a second embodiment of the present disclosure.
Figure 10:
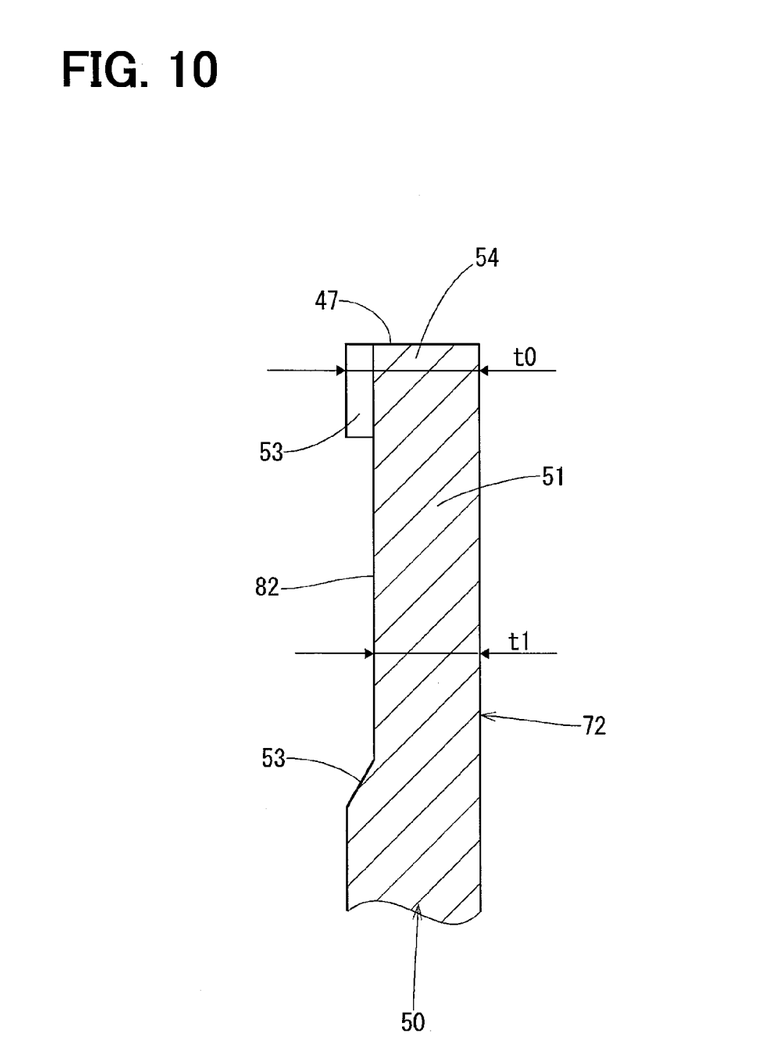
FIG. 10 is a cross sectional view of a part in FIG. 9 along a line X-X.

The rotor in the second embodiment of the present disclosure is described with reference to FIG. 9 and FIG. 10. Like parts have like numbers in the first and second embodiments.

In a rotor 80, a thinned part 82 of the board member 50 reaches the convex surface 47. Further, a position of the thinned part 82 along the circumferential direction is arranged not to be overlapping with a width range β of the permanent magnet 48 along the circumferential direction.

According to the second embodiment, the cogging torque may be further reduced in comparison to the first embodiment. Further, an increase of the cogging torque caused by an inclusion of the position of the thinned part 82 in the circumferential width range β of the permanent magnet 48 is prevented.

Third Embodiment

Figure 11:
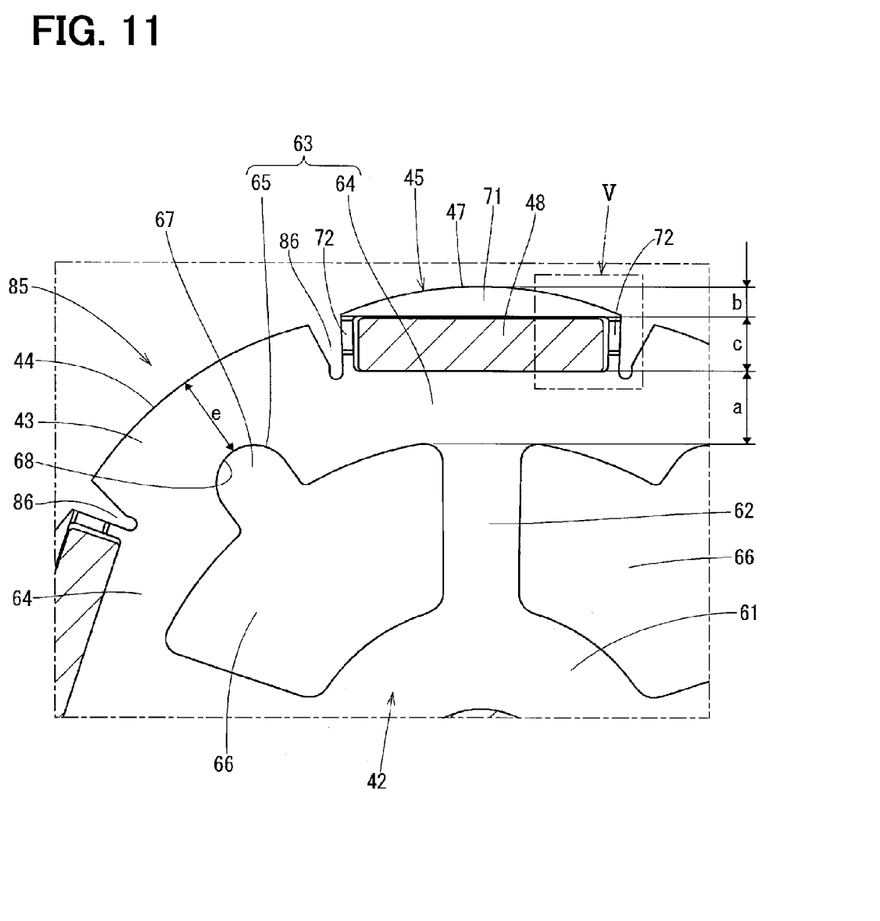
FIG. 11 is an enlarged view of an essential part of the rotor in a third embodiment of the present disclosure.

The rotor in the third embodiment of the present disclosure is described with reference to FIG. 11. Like parts have like numbers in the first, second, and third embodiments.

In a rotor 85, a gap 86 between the magnetic pole 45 and the soft magnetic material pole 43 extends further in the radial direction toward the rotation shaft 41, that is, extends more inwardly or deeper than the permanent magnet 48 in the radial direction.

According to the third embodiment, a spill of the magnetic flux from a space between the magnetic pole 45 and the soft magnetic material pole 43 is reduced further, and the magnetic flux distribution in a gap between the rotor 85 and the stator 30 is made smoother.

Other Embodiments

In an alternative embodiment of the present disclosure, the winding may be wound by a short-pitch winding method or other winding methods.

In another alternative embodiment of the present disclosure, the permanent magnet may be divided in the radial direction and/or in the axial direction. That is, in other words, plural permanent magnets may be accommodated in a single magnet hole.

In yet another alternative embodiment of the present disclosure, the magnetic resistance part of the yoke may be formed by reducing the thickness of the board member or by similar methods, and not necessarily by providing a concave cavity. Further, even when the magnetic resistance part of the yoke is formed by providing a concave cavity, the concave cavity may be a bore that is not a through hole that penetrates the rotor.

In still yet another alternative embodiment of the present disclosure, the position of the rib may be other parts other than the radial inside of the magnetic pole in the radial direction. That is, the rib may be positioned at the radial inside of the soft magnetic material pole in the radial direction, for example.

Further, in another alternative embodiment of the present disclosure, the total number of the poles in one motor may be other than 10, and the number of the slots may be other than 60.

Moreover, in another alternative embodiment of the present disclosure, the motor may be installed in a device other than the vehicular electric power steering.

Even further, in another alternative embodiment of the present disclosure, the rotor may be applied to a dynamo/generator.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A rotor in a rotating electric machine comprising:
   a cylindrical boss having a rotation axis;
   a plurality of ribs extending radially outward from the cylindrical boss;
   a cylindrical yoke connecting outer radial ends of the plurality of ribs;
   a plurality of soft magnetic material poles extending radially outward from the cylindrical yoke;
   a plurality of magnetic poles extending radially outward from the cylindrical yoke at positions between the plurality of the soft magnetic material poles, and each magnetic pole having a magnet hole; and
   a plurality of permanent magnets positioned within the cylindrical yoke, the plurality of permanent magnets having a thickness direction aligned with a radial direction of the cylindrical yoke, and each permanent magnet positioned within each magnet hole, wherein
   each magnetic pole has (i) a magnetism transfer part positioned outside of the magnet hole such that the magnetism transfer part extends radially outward with respect to the rotation axis and relative to the magnet hole, and (ii) a connecting part connecting circumferential ends of the magnetism transfer part,
   a width of the cylindrical yoke in the radial direction is defined as 'a',
   a width of the magnetism transfer part in the radial direction is defined as 'b', and $2.0 \leq (a/b) \leq 2.7$.

2. The rotor of claim 1, wherein
   a width of each magnet hole in the radial direction is defined as 'c', and $b \leq c \leq a$.

3. The rotor of claim 1, wherein
   the cylindrical yoke has a plurality of magnetism resistant parts, and
   each magnetism resistant part has a radial distance from the rotation axis that is less than the radial distance of the rotation axis to a circumferential midpoint of each soft magnetic material pole.

4. The rotor of claim 3, wherein
   each magnetism resistant part has a concave cavity.

5. The rotor of claim 4, wherein
   a shortest distance in a radial direction between (i) a convex surface of each soft magnetic material pole and (ii) a concave surface of each concave cavity is defined as 'e', and $a \leq e \leq (a+b)$.

6. The rotor of claim 1, wherein
   each soft magnetic material pole and each magnetic pole has a convex surface, and
   the convex surface has a circumferential midpoint at a radial distance from the rotation axis that is greater than a radial distance of the circumferential edges of the convex surface from the rotation axis.

7. The rotor of claim 1, wherein
   the connecting part has a higher magnetic resistance than the magnetism transfer part.

8. The rotor of claim 1, wherein
   the cylindrical boss, the rib, the cylindrical yoke, the plurality of soft magnetic material poles, and the plurality of magnetic poles are formed as layered board members that are layered along an axial direction,
   a first portion of a layered board member serves as the connecting part,
   a second portion of the layered board member serves as the magnetism transfer part, and
   a board thickness of the first portion is thinner than a board thickness of the second portion.

9. The rotor of claim 8, wherein
   the board thickness varies along the length of the first portion.

10. The rotor of claim 8, wherein
    the board thickness of a narrowed region of the first portion is at least 10% thinner than the board thickness of the second portion.

11. The rotor of claim 10, wherein
    the narrowed region of the first portion extends in the radial direction to contact a convex surface of each magnetic pole.

12. The rotor of claim 8, wherein
    a width of the connecting part in a circumferential direction is defined as 'w1',
    the board thickness of the second portion is defined as 't0', and $1.0 \leq (w1/t0) \leq 2.0$.

13. The rotor of claim 1, wherein
    the cylindrical boss, the rib, the cylindrical yoke, the plurality of soft magnetic material poles, and the plurality of magnetic poles are formed as layered board members that are layered along an axial direction.

14. A rotating electric machine comprising:

a rotor having a cylindrical boss with a rotation axis;

a plurality of ribs extending radially outward from the cylindrical boss;

a cylindrical yoke connecting outer radial ends of the plurality of ribs;

a plurality of soft magnetic material poles extending radially outward from the cylindrical yoke;

a plurality of magnetic poles extending radially outward from the cylindrical yoke at positions between the plurality of the soft magnetic material poles, and each magnetic pole having a magnet hole;

a plurality of permanent magnets positioned within the cylindrical yoke, the plurality of permanent magnets having a thickness direction aligned with a radial direction of the cylindrical yoke, and each permanent magnet positioned within each magnet hole;

a back yoke having a cylindrical shape connecting a plurality of teeth that are positioned along an inner periphery of the back yoke and extend radially inward toward the rotor from the inner periphery of the back yoke; and a winding disposed in a slot that is defined as a space between each of the plurality of teeth, wherein each magnetic pole has (i) a magnetism transfer part positioned outside of the magnet hole such that the magnetism transfer part extends radially outward with respect to the rotation axis and relative to the magnet hole, and (ii) a connecting part connecting circumferential ends of the magnetism transfer part, a width of the cylindrical yoke in the radial direction is defined as 'a', a width of the magnetism transfer part of the magnetic pole in the radial direction is defined as 'b', $2.0 \leq (a/b) \leq 2.7$, a shortest distance of a gap between the rotor and the plurality of teeth is defined as $\delta$, and $2\delta \leq b \leq 4\delta$.

15. The rotating electric machine of claim 14, wherein the winding is a full-pitch winding, and the rotating electric machine is a brushless motor used in a vehicle electric power steering system.

\* \* \* \* \*